United States Patent
Su et al.

(10) Patent No.: US 9,917,916 B2
(45) Date of Patent: Mar. 13, 2018

(54) MEDIA DELIVERY SERVICE PROTOCOL TO SUPPORT LARGE NUMBERS OF CLIENT WITH ERROR FAILOVER PROCESSES

(71) Applicant: Apple Inc., Cupertino, CA (US)

(72) Inventors: John Y. Su, Sunnyvale, CA (US); David L. Biderman, San Jose, CA (US); Roger N. Pantos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 612 days.

(21) Appl. No.: 14/193,739

(22) Filed: Feb. 28, 2014

(65) Prior Publication Data

US 2014/0281707 A1    Sep. 18, 2014

Related U.S. Application Data (60) Provisional application No. 61/783,811, filed on Mar. 14, 2013.

(51) Int. Cl.
*H04L 29/08* (2006.01)
*H04L 29/06* (2006.01)
(Continued)

(52) U.S. Cl.
CPC ...... *H04L 67/2842* (2013.01); *G06F 11/1402* (2013.01); *H04H 20/40* (2013.01);
(Continued)

(58) Field of Classification Search
CPC .................................................. H04L 67/2842
(Continued)

(56) References Cited

U.S. PATENT DOCUMENTS

| 5,444,848 A | 8/1995 | Johnson, Jr. et al. |
| 5,636,216 A | 6/1997 | Fox et al. |

(Continued)

FOREIGN PATENT DOCUMENTS

| CN | 103004133 A | 3/2013 |
| EP | 2249586 A2 | 11/2010 |

(Continued)

OTHER PUBLICATIONS

Taiwanese Office Action, dated Dec. 2, 2015, from corresponding Taiwanese Patent Application No. 103109242, filed Mar. 14, 2014.
(Continued)

*Primary Examiner* — David Lazaro
*Assistant Examiner* — Zia Khurshid
(74) *Attorney, Agent, or Firm* — Baker Hostetler LLP; Robert L. Hails (57) ABSTRACT

A media delivery service may include a media source, a proxy cache and one or more client devices. The media source may generate coded segments from an input media stream and develop a playlist identifying network locations of the segments. The media source may broadcast the coded segments and their storage locations to a proxy cache in a broadcast channel. The proxy cache may store successfully received coded segments and develop a mapping table identifying the segments' network locations. The client may request segments from the proxy cache based on the received playlist form the media source. If the proxy cache does not store a requested segment, it may so notify the client and the client may request the segment from the media source.

18 Claims, 4 Drawing Sheets

(51) Int. Cl.
*H04H 20/40* (2008.01)
*H04N 21/433* (2011.01)
*H04N 21/845* (2011.01)
*H04N 21/414* (2011.01)
*H04N 21/6408* (2011.01)
*G06F 11/14* (2006.01)

(52) U.S. Cl.
CPC ...... *H04L 65/4076* (2013.01); *H04L 65/4084* (2013.01); *H04L 65/605* (2013.01); *H04N 21/41407* (2013.01); *H04N 21/4331* (2013.01); *H04N 21/6408* (2013.01); *H04N 21/8456* (2013.01)

(58) Field of Classification Search
USPC .......................................................... 709/213
See application file for complete search history.

(56) References Cited

U.S. PATENT DOCUMENTS

| | | | |
|---|---|---|---|
| 5,678,041 A | 10/1997 | Baker et al. | |
| 5,708,780 A | 1/1998 | Levergood et al. | |
| 5,748,901 A | 5/1998 | Afek et al. | |
| 5,818,510 A * | 10/1998 | Cobbley | G06F 17/30817 |
| | | | 348/E5.108 |
| 5,835,718 A | 11/1998 | Blewett | |
| 5,852,717 A | 12/1998 | Bhide et al. | |
| 5,864,852 A | 1/1999 | Luotonen | |
| 5,918,013 A | 6/1999 | Mighdoll et al. | |
| 6,047,322 A | 4/2000 | Vaid et al. | |
| 6,119,235 A | 9/2000 | Vaid et al. | |
| 6,122,514 A | 9/2000 | Spaur et al. | |
| 6,185,598 B1 | 2/2001 | Farber et al. | |
| 6,286,031 B1 | 9/2001 | Waese et al. | |
| 6,298,386 B1 | 10/2001 | Vahalia et al. | |
| 6,304,892 B1 | 10/2001 | Bhoj et al. | |
| 6,308,216 B1 | 10/2001 | Goldszmidt et al. | |
| 6,360,270 B1 | 3/2002 | Cherkasova et al. | |
| 6,526,448 B1 | 2/2003 | Blewett | |
| 2007/0174866 A1* | 7/2007 | Brown | H04N 7/17318 |
| | | | 725/28 |
| 2007/0266169 A1* | 11/2007 | Chen | H04L 65/4084 |
| | | | 709/231 |
| 2010/0281509 A1 | 11/2010 | Yu et al. | |
| 2011/0087706 A1 | 4/2011 | Gole et al. | |
| 2012/0297410 A1* | 11/2012 | Lohmar | H04N 21/2407 |
| | | | 725/14 |
| 2013/0080777 A1 | 3/2013 | Martell et al. | |
| 2013/0114597 A1* | 5/2013 | Ogisawa | H04L 12/185 |
| | | | 370/390 |

FOREIGN PATENT DOCUMENTS

| | | |
|---|---|---|
| EP | 2597824 | 5/2013 |
| TW | 201234839 A | 8/2012 |
| WO | 2012/011449 A1 | 1/2012 |

OTHER PUBLICATIONS

International Search Report and Written Opinion of the International Search Authority in counterpart International Application No. PCT/US2014/019431, dated Jun. 11, 2014, 15 pages.
Pantos R. et al., "HTTP Live Streaming: draft-pantos-http-live-streaming-09", HTTP Live streaming, Internet Society (ISOC) 4, Geneva, Switzerland, Sep. 23, 2012. XP015087423, pp. 1-37.

* cited by examiner

FIG. 4
400

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Control Byte 514 | | | | | | | | Sequence Number 512 | | | | | | | | | | | | | | | | | | | | Ver | | T |
| 4 | 32 | URL of New Segment from Playlist 516 [if control indicates new segment] 518 | | | | | | | | | | | | | | | | | | | | | | | | | | | | | | |

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Sequence Number 522 | | | | | | | | | | | | | | | | | | | | | | | | | | | | Ver | | T 526 |
| 4 | 32 | Data Byte 0 | | | | | | | | Data Byte 1 | | | | | | | | Data Byte 2 | | | | | | | | Data Byte 3 | | | | | | | |
| 8 | 64 | Data Byte 4 | | | | | | | | Data Byte 5 | | | | | | | | Data Byte 6 | | | | | | | | Data Byte 7 524 | | | | | | | |
| ... | ... | ... | | | | | | | | ... | | | | | | | | ... | | | | | | | | ... | | | | | | | |
| 188 | 1504 | Data Byte 184 | | | | | | | | Data Byte 185 | | | | | | | | Data Byte 186 | | | | | | | | Data Byte 187 | | | | | | | |

MEDIA DELIVERY SERVICE PROTOCOL TO SUPPORT LARGE NUMBERS OF CLIENT WITH ERROR FAILOVER PROCESSES

PRIORITY CLAIM

The present application claims priority to U.S. Provisional Application No. 61/783,811, filed on Mar. 14, 2013, the entirety of which is incorporated by reference herein.

BACKGROUND

The present disclosure relates to real time coding and broadcast of media streams, such as live media.

Currently, network-based media delivery services are available that support delivery of coded video for real time media feeds, such as live media. Those media delivery services typically code an input video sequence, called a "media stream" herein, as coded video data that has been parsed into a plurality of separately-deliverable segments. Each segment may represent a portion of the source media stream, for example, a five or ten second increment of the media stream. The media delivery service may include an HTTP server that responds to requests from other devices on the network, called "clients" herein, and furnishes the coded segments in response to those requests. The requests typically identify requested segments by an address, such as a uniform resource locator (commonly, "URL"). A common server may respond to service requests from a number of different client devices contemporaneously. In this regard, the request-response operations of the server and clients represent a plurality of overlapping unicast transmissions that are managed by the server.

The unicast nature of the server-client communications can be advantageous because, if network communication errors arise that cause transmitted packets to be lost before they are received by the client, the client can identify such errors and re-request lost packets. Unicast transmission, however, also has associated costs. For popular media streams within a network, the number of requesting clients may exceed the server's capacity to provide service. Moreover, since each requesting client is provided with its own copy of a coded segment, support of multiple unicast transmissions also can consume unnecessary bandwidth within a network between the server and the client. Accordingly, use of unicast transmissions can constrain the number of client devices that a media delivery server can serve.

Networking protocols also support broadcast delivery protocols in which a server provides data in a broadcast channel that is distributed to a variety of devices on a network in common. Use of broadcast channels can reduce loading on servers but can be disadvantageous because it does not provide a mechanism for a receiving device to recover from lost packets. This inability to recover from lost packets can be particularly problematic in the case of coded video data because various portions of coded video (such as reference frames) must be successfully received and decoded before other portions of the coded video can be decoded. If data representing the reference frames were lost, data of other frames that rely on the reference frames could not be decoded even if the data of those other frames was successfully received. Accordingly, use of broadcast channels can be disadvantageous in media delivery systems.

The inventors perceive a need in the art for a media delivery system that permits a delivery server to provide service to client devices in excess of its ability to provide unicast service and still permits recovery from transmission errors that can occur due to, for example, packet loss.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Embodiments of the present invention provide a media delivery service that includes a media source, a proxy cache and one or more client devices. The media source may generate coded segments from an input media stream and develop a playlist identifying network locations of the segments. The media source also may broadcast the coded segments and their storage locations to one or more proxy caches in a broadcast channel. The proxy cache may store successfully received coded segments and also develop a mapping table identifying the segments' network locations.

When a client accesses the coded media stream, it may download the playlist from the media source. It may direct requests to the proxy cache identifying the network locations of requested segments, which will be furnished by the proxy cache so long as the proxy cache stores them. If the proxy cache does not store a requested segment, it may so notify the client and the client may request the segment from the media source.

In one embodiment, the proxy cache may be a transparent proxy cache intercepting communications between the client and the media source. Based on the communications, the transparent proxy cache may request and store coded segments for the client.

In this regard, loading issues may be alleviated at media source servers because the servers provide coded video to proxy caches in broadcast channels. The media source servers also field requests directly from client devices when transmission errors interfere with reception of segments at the proxy cache but, in practice, these requests should represent a much smaller loading issue to the servers than would direct service of unicast transmissions with a large number of client devices. The client devices should receive the coded segments from the proxy cache in the first instance (or from multiple proxy caches, which can be distributed throughout the network).

Figure 1:
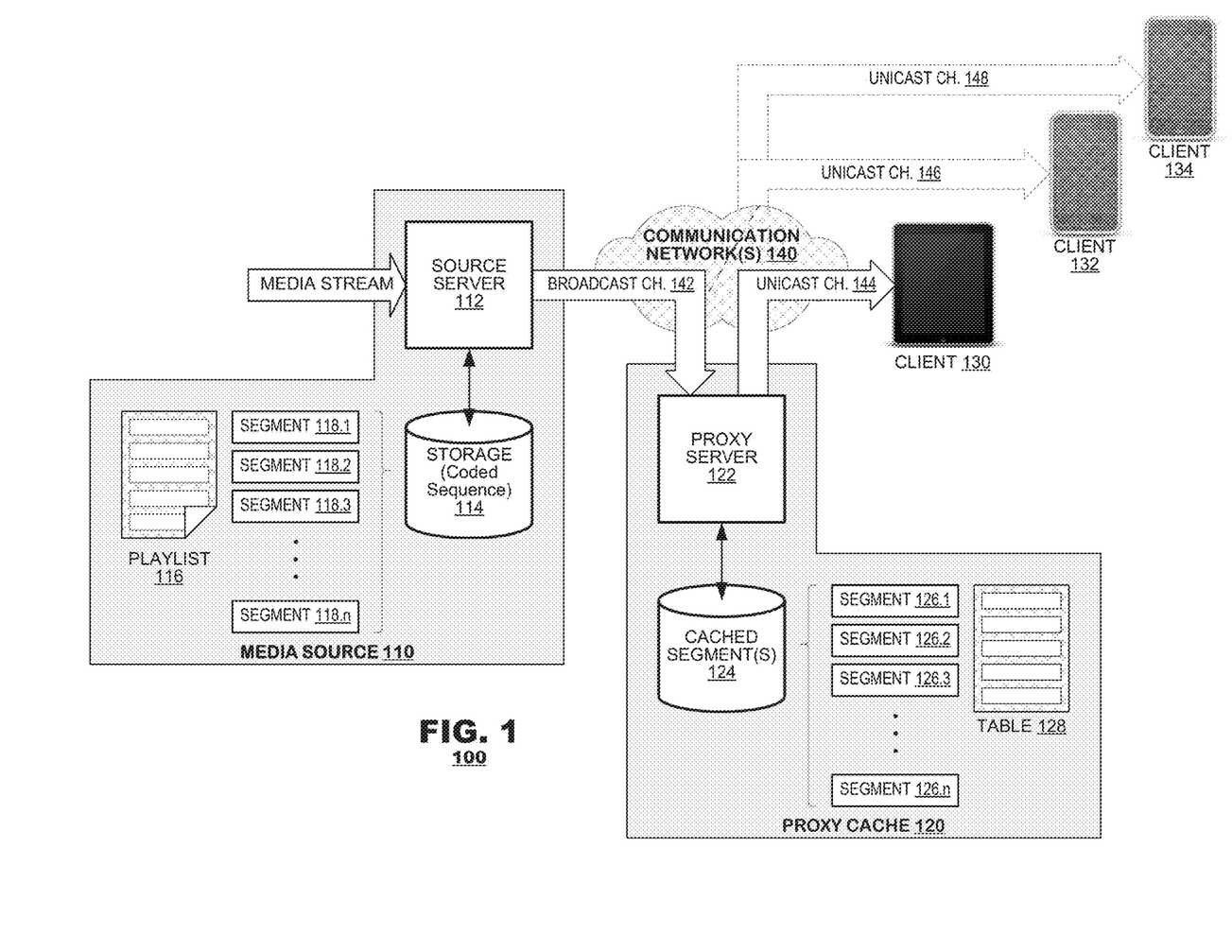
FIG. 1 illustrates a functional block diagram of a streaming system according to an embodiment of the present invention.

FIG. 1 illustrates a functional block diagram of a streaming system 100 according to an embodiment of the present invention. The system may include a media source 110, a proxy cache 120 and one or more client devices 130 interconnected via a communication network 140.

The media source 110 may include a source server 112 and a storage system 114. The source server 112 may perform processing operations on behalf of the media source 110. These operations may include coding of a source media stream into segments 118.1-118.n of coded video data. The operations may also include development and maintenance of a playlist 116 identifying storage locations of the segments 118.1-118.n that are stored at the media source 110. The source server 112 may transmit the coded video segments to other system components in a broadcast channel 142 (for example, the proxy cache 120). The source server 112 may also perform fulfillment of service requests made to the media source 110 by other system components (for example, the client device 130).

The storage system 114 may store the playlist 116 and coded segments 118.1-118.n. The playlist 116 may identify segments 118.1-118.n that are currently present in the storage system 114. Optionally, the playlist 116 may identify network locations of the proxy cache(s) 120 that support caching of segments 118.1-118.n stored by the media source 110.

The proxy cache 120 may include a proxy server 122 and a storage system 124. The proxy server 122 may perform processing operations on behalf of the proxy cache 120. These operations may include "tuning" to broadcast channels from one or more media sources 110 and caching datagrams of coded segments 126.1-126.n locally at the proxy cache 120. The operations of the proxy server 122 may also include fulfillment of service requests made to the proxy cache 120 by other system components, for example, client device(s) 130.

The storage system 124 may store coded segments 126.1-126.n and an index table 128 that associates the segments with URLs from which they can be downloaded at the media source 110.

The client device(s) 130 may represent media players that download coded segments from either the media source 110 or proxy cache 120, as discussed herein, decode the coded segments and render them for playback. Representative client devices include smartphones, tablet computers, laptop computers, personal computers, set-top boxes and other consumer electronic products designed to decode and render coded video.

During operation, a media source 110 may receive and code an input media stream as a plurality of coded segments 118.1-118.n and may generate a playlist 116 to identify segments that are stored by a server 112 of the media source 110. The media source 110 may transmit the coded segments 118.1-118.n to entities on the communication network 140 in a broadcast channel 142. For streaming applications involving live video, the media source 110 may store coded video segments of a predetermined amount of time (for example, 5 mins. of source video) and thus, older segments may be evicted from storage 114 as new segments are generated and stored. Similarly, the playlist 116 may be updated over time to reflect generation of new segments and eviction of older segments.

The proxy cache 120 may receive the broadcast channel 142 and may cache the coded segments 126.1-126.n locally in storage 124. The proxy cache 120 also may develop a mapping table 128 that identifies addresses of the segments 118.1-118.n as they are stored by the media source 110. The proxy cache 130 may store new segments as they are received from the broadcast channel 142 and evict others from storage 124.

The client device(s) 130 may download coded segments from either the proxy cache 120 or the media source 110 for decoding and rendering. In an embodiment, the client 130 may download a playlist 116 from the media source 110. The client 130 may select a coded segment (say, segment 118.3) for delivery and decoding. The client 130 may direct a request to the proxy cache 120 in the first instance, identifying an address of the segment 118.3. In response, the proxy cache 120 may compare the address received in the client's request to the table 128 of segments that it holds locally in storage 124. If the comparison yields a match, the proxy cache 130 may retrieve a coded segment 126.3 that corresponds to the matching address and may furnish it to the client 130. The client 130 may decode and render the segment 126.3, advance to a next entry in the playlist 116 and direct another request to the proxy cache 120.

If the proxy cache's comparison does not yield a match, the proxy cache 130 may send a reply to the client 130 indicating a "miss." In response, the client 130 may direct a request to the media source 110. If the media source 110 stores the requested segment 118.3, it may furnish the segment 118.3 to the client 130 for decoding and rendering. Thereafter, the client 130 may advance to the next entry in the playlist 116 and direct another request to the proxy cache 120.

It is possible that the client 130 will issue a request to the media source 110 that identifies a segment that no longer is stored at the media source 110, for example, because it has been evicted from storage 114. In such an event, the client 130 may engage an error recovery process to resynchronize to the coded media stream. For example, the client 130 may jump to a new entry of the playlist 116 that is several spots ahead of the previously requested segment in time, which should reference another segment that is "newer" in time and, therefore, more likely to be present in storage 124, 114 at the proxy cache 120 and the media source 110.

The client 130 may refresh its copy of the playlist 116 from time to time and continue with the processes described above by downloading coded segments from the proxy cache 120 in the first instance and from the media source 110 if the requests miss the proxy cache 120. This operation may continue until the client 130 discontinues playing the media stream.

The architecture of system 100 alleviates resource issues at media sources 110 by allowing the media source 110 to broadcast segments throughout the communication network 140 via a broadcast channel 142. This limits the number of unicast channels (e.g., unicast channels 144-148) that otherwise would be supported by a source server 112 within the media source 110 by requests by multiple clients 130-134. Therefore, the architecture contributes to resource conservation at the media source 110. Unicast communications may be handled by server(s) 122 within the proxy cache 120 which may be provisioned to handle requests from multiple clients 130-134 more efficiently than the source server(s) 112.

The architecture presented in FIG. 1 illustrates entities that are involved in coding, caching and decoding of a single coded media stream. This architecture may be expanded to accommodate multiple instances of media sources 110, proxy caches 120 and clients 130-134.

For example, a single media source 110 may code and transmit multiple media streams to proxy cache 120 in different broadcast channels. In another embodiment, a single media source 110 may code and transmit a common media stream in a variety of different bit rates or a variety of different frame sizes to accommodate capabilities of different types of clients. Each coded variant of a media stream may be considered to be a different coded media sequence for purposes of the present discussion.

In another embodiment, a single media source 110 may broadcast coded media streams to multiple proxy caches 120 within a network environment. Indeed, the media source 110 may identify network locations of proxy caches 120 that are known to the media source 110 in the playlist 116. In cases where multiple proxy caches 120 are available, a client 130 may request service from a second proxy cache 120 in response to a miss indication from a first proxy cache 120.

A single proxy cache 120 may tune to multiple broadcast channels, either from a common media source 110 or multiple media sources, and cache segments of multiple media streams. Moreover, a single proxy cache 120 may provide coded segments of a common media sequence to a variety of different client devices 130-134 in parallel unicast channels 144-148.

The configuration illustrated in FIG. 1 presents a generalized architecture of the system 100 in which a common network 140 is illustrated as carrying communication from the media source 110 to the proxy cache 120 and from the proxy cache 120 to the client device 130. However, the principles of the present invention find application with a variety of different implementations.

In one implementation, the media source 110, proxy cache 120 and client devices 130 may communicate with each other via a common network such as the Internet. In another implementation, the media source 110 may be connected to the proxy cache 120 via a first communication network (not shown) and the proxy cache 120 may be connected to the client device 130 may be carried by a wholly separate network (also not shown). For example, the proxy cache 120 may be provided as a gateway device or router (not shown) that is connected to the client 130 by a wired or wireless local area network. The proxy cache 120 may be connected to the media source 110 via a wide area network. In other configurations, the media source 110 and proxy cache 120 may be co-located within a common server system, in which case there need not be an externally accessible network provided between them.

Thus, the distribution, topology and architecture of the communication network(s) 140 is immaterial to the operation of the present invention unless discussed otherwise herein. Indeed, the communication network 140 may represent a combination of network systems and topologies, including wireline- and/or wireless-based network systems. Further, client devices 130 may access the communication network 140 by wireline- and/or wireless-based access technologies.

The proxy cache 120 may operate according to different eviction policies than the media source 110 and, therefore, it is possible that the proxy cache 120 may store a greater amount of coded video data (say, 10 mins.) than the media source 110, if application needs warrant. Conversely, the proxy cache 120 may be configured to store a lesser amount of coded video data (say, 3 mins.) to suit other application needs.

In one embodiment, the proxy server 122 may periodically receive the playlist 116 from the media source 110. The proxy server 122 may use the playlist to determine which segments were not received and/or which segments can be deleted from the proxy cache 120. The proxy server 122 also may provide the playlist to the clients 130-134.

FIG. 1 illustrates a simplified implementation of a media source 110 in which a single server 112 is shown as performing both the video coding and delivery operations of the media source 110. The principles of the present invention, however, find applications in more robust systems. For example, in practice, the media source 110 may be populated by a networked system of servers (not shown in FIG. 1). In such implementations, it is permissible to provide some servers as dedicated video coding servers and other servers as dedicated media delivery servers.

In one embodiment, the proxy cache 120 may be a transparent proxy cache intercepting communications between the client devices 130 and the media source 110. Based on the communications, the transparent proxy cache 120 may request and store coded segments for the client. For example, the transparent proxy cache 120 may intercept the playlist or the request for the playlist sent from the media source 110 to the client device 130. Based on this information the transparent proxy cache 120 may request and store the coded segments from the media source 110. The transparent proxy cache 120 also may develop a mapping table that identifies addresses of the segments as they are stored by the media source 110. Once the coded segments are stored on the transparent proxy cache 120, the transparent proxy cache 120 may provide the requested coded segments to the client device(s) 130.

Figure 2:
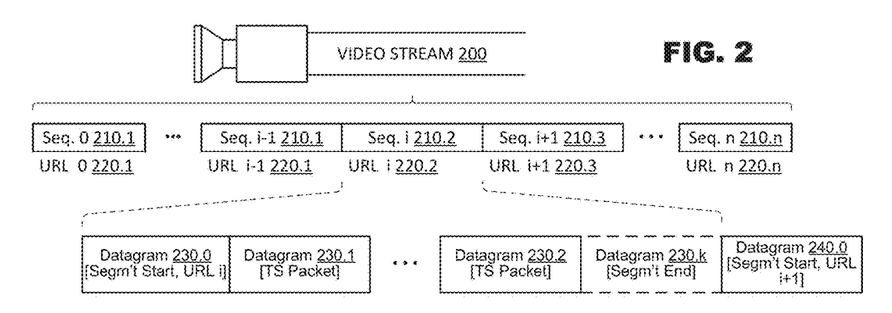
FIG. 2 illustrates a coding architecture for a video stream according to an embodiment of the present invention.

FIG. 2 illustrates a coding architecture for a video stream 200 according to an embodiment of the present invention. Although the video stream 200 is shown as originating from a camera, the stream may be provided to the system 100 from another source, such as a media feed (such as a satellite feed or production feed) or from a storage device, as application needs warrant.

The video stream 200 may be represented as a sequence of individual source frames. The video stream 200 may be coded according to one or more compression algorithms, which typically yield a sequence of compressed frames having a reduced data rate as compared to the source frames. The coded video sequence may be parsed into a plurality of coding segments 210.1-210.$n$ that may be stored by the media source 110 at discrete locations from each other. For example, each segment may be stored by the media source 110 at locations that can be referenced by unique uniform resource locators 220.1-220.$n$ (commonly, "URLs").

The coding segments themselves may be parsed into datagrams for transmission via a communication channel. For example, segment i (210.2) is illustrated as having been parsed into a plurality of datagrams 230.0-230.$k$ for delivery. The datagrams may operate according to a protocol in which a first datagram 230.0 within a segment 210.2 includes a control code indicating the start of a new segment. The datagram 230.0 also may include data representing a URL of the segment 210.2 as stored by the media server 110. Other datagram(s) 230.1-230.$k$ within the segment 210.2 may include video data of the segment 210.2. Optionally, a final datagram 230.$k$ may include a control code indicating termination of the segment 210.2. The end-of-segment control code need not be employed in all embodiments. In other embodiments, the start-of-segment of a next segment (e.g., datagram 240.0 for segment 210.3) may indicate termination of a prior segment 210.2.

The datagrams 230.0-240.$k$ may include sequence numbers indicating a transmission order of the datagrams.

Figure 3:
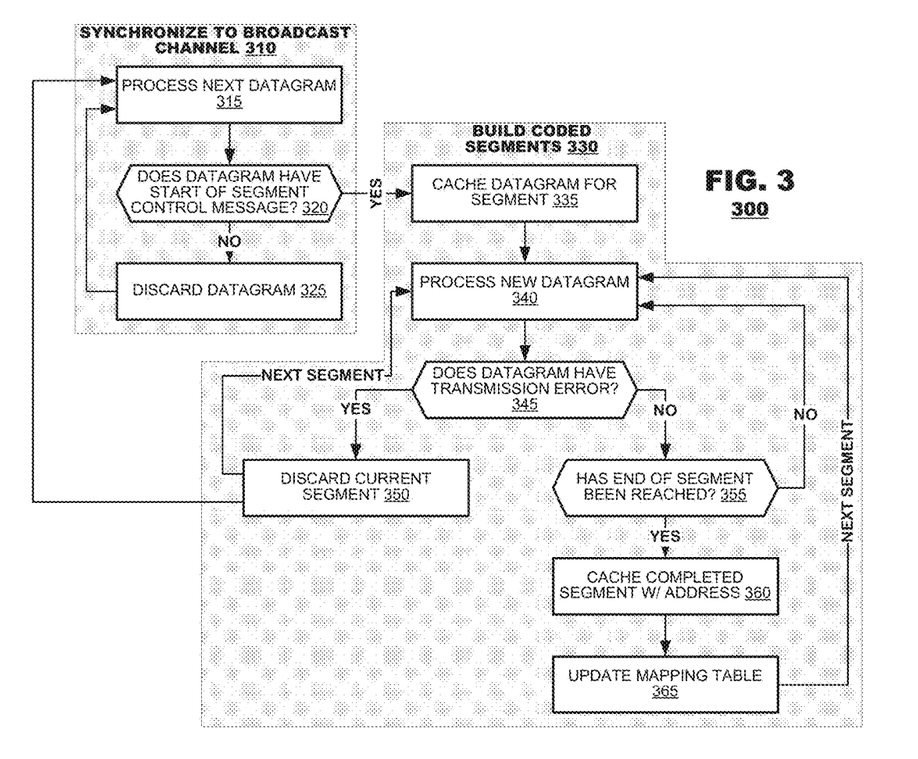
FIG. 3 illustrates a method of operation of a proxy cache according to an embodiment of the present invention.

FIG. 3 illustrates a method 300 of operation of a proxy cache according to an embodiment of the present invention. According to this embodiment, the method 300 may include synchronizing to a new broadcast channel (box 310) and building coded segments (box 330).

Synchronizing to the new broadcast channel (box 310) may iteratively: receive a datagram from the broadcast channel (box 315), determine whether the datagram has a start-of-segment control message (box 320), and if the datagram does not have a start-of-segment control message, discard the received datagram (box 325) and receive the next datagram from the broadcast channel (box 315). Once the method 300 identifies a start-of-segment control message (e.g., yes in box 320), the method 300 is synchronized to the broadcast channel.

Building the coded segments from the datagram (box 330) may include processing received datagrams to construct complete segments and providing mapping to the complete segments. For example, the proxy cache may iteratively: cache the datagram received with the start-of-segment control message (box 335), receive a new datagram from the broadcast channel (box 340), and determine from the sequence identifiers, whether a transmission error has occurred with reception of the current segment (box 345). If a transmission error has occurred, the method 300 may discard the current segment (box 350). If a transmission error has not occurred, the method 300 may determine whether the end of the current segment has been reached (box 355). If the end of the current segment has not been reached (NO in box 355), the method 300 may return to box 330 to process the next datagram in sequence. If the end of the current segment has been reached (YES in box 355), the method 300 may cache the completed segment in storage (box 360) and may update the mapping table with the address of the segment as represented in the start-of-segment control message (box 365).

After the operations of box 350 or 365 are completed, the method 300 may return to box 330 to begin work on another segment.

If a transmission error has occurred (YES in box 345) and the current segment is discarded (box 350), the method 300 may return to box 330 to begin work on another segment. In another embodiment, after the current segment is discarded (box 350), the method 300 may return to box 315 to begin the synchronization to the new broadcast channel. In one embodiment, the method may return to box 315 to begin the synchronization again if a predefined number of current segments are discarded.

The method 300 may build segments from the datagrams that it receives from the broadcast channel. Transmission integrity may be confirmed by examining sequence numbers present in the datagrams to ensure they are received in order. If the method determines that a datagram was not properly received, for example, because it was corrupted or never received, the proxy cache may discard the segment to which the missing datagram belongs. If clients make service request to the proxy cache requesting the discarded segment, the proxy cache may return a miss indicator which should induce the client to request the segment from the media source instead.

Figure 4:
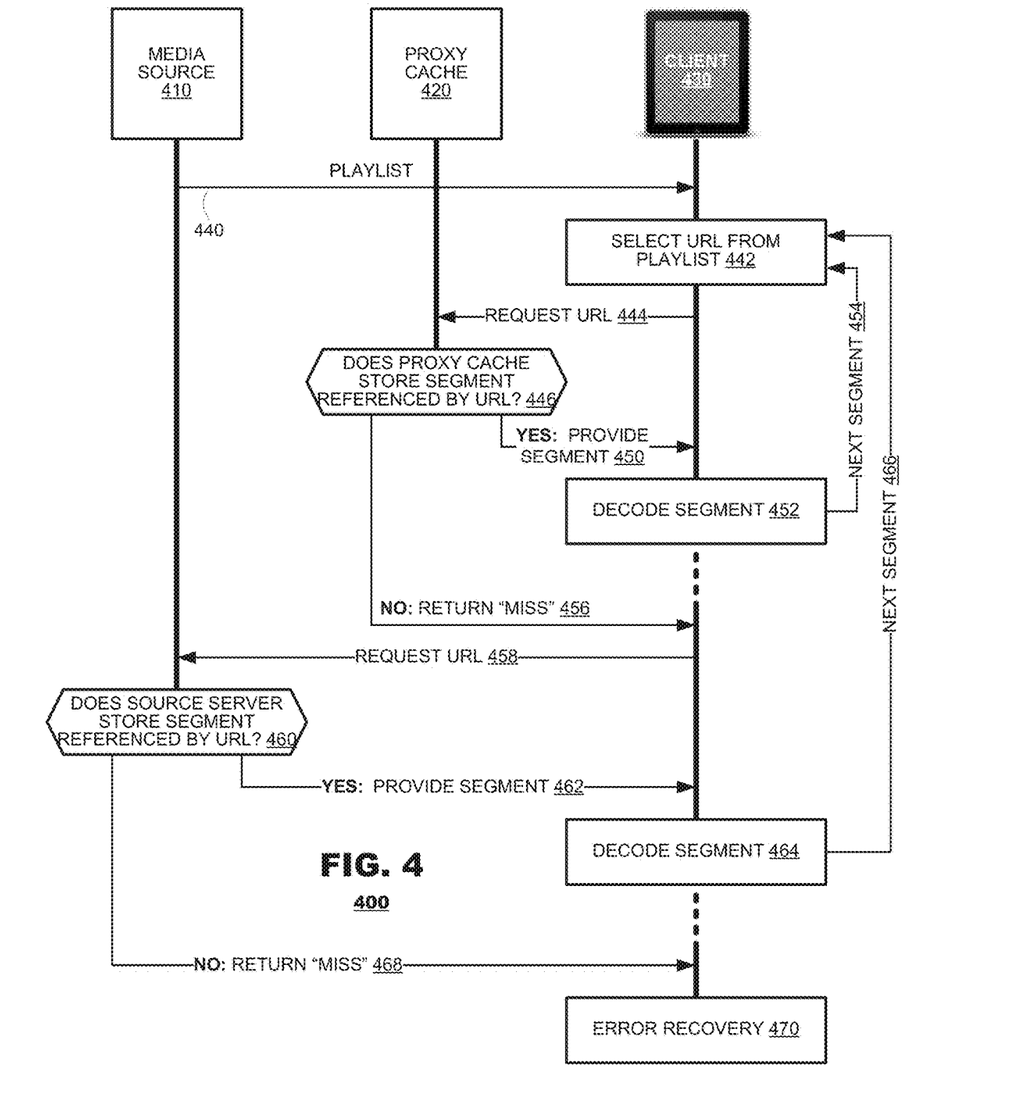
FIG. 4 illustrates exemplary communication flow between a media source, a proxy cache and a client according to an embodiment of the present invention.

FIG. 4 illustrates exemplary communication flow between a media source 410, a proxy cache 420 and a client 430 according to an embodiment of the present invention. In this example, the communication flow may begin when a client 430 downloads a playlist from the media source 410 (message 440). The client 430 may select an address (in this example, a URL) from the playlist (box 442) and may send a request to the proxy cache 420 identifying the URL of the requested segment (message 444).

The proxy cache 420 may determine whether it stores a segment referenced by the URL (box 446). If the proxy cache 420 stores the requested segment, the proxy cache 420 may send the requested segment to the client 430 (message 450). If the proxy cache 420 does not store the requested segment, the proxy cache 420 may return a "miss" indication to the client 430 (message 456).

If the requested segment is provided by the proxy cache 420 (message 450), the client 430 may decode the segment (box 452) and return to box 442 for a next segment (flow 454). In response to a miss indication from the proxy cache 420 (message 456), the client 430 may send a request to the media source 410 identifying the URL of the requested segment (message 458).

The media source 410 may determine whether it stores the segment referenced by the URL (box 460). If the media source 410 store requested segment, the media source 410 may send the requested segment to the client 430 (message 462). If the media source 410 does not store requested segment, the media source 410 may return a "miss" indication to the client 430 (message 468).

If the requested segment is provided by the media server 410 (message 462), the client 430 may decode the segment (box 464) and return to box 442 for a next segment (flow 466). In response to a miss indication from the media server 410 (message 468), the client 430 may engage in an error recover process 470.

The client 430 may identify the proxy cache 420 in a variety of ways. The client 430 may have subscribed to a service for media delivery that identifies network locations of proxy cache(s) 420 that support unicast delivery of segments from the media source 410, in which case network locations of the proxy cache(s) 420 may be stored locally by the client 430 as part of configuration data (not shown). Alternatively, the client 430 may discover network locations of a proxy cache 420 dynamically from information provided by the media source 410 in, for example, the playlist. Moreover, in another embodiment, a proxy cache 420 may identify network locations of other proxy cache(s) (not shown) that also support streaming of the media sequence, which the client 430 may address if it detects sub-optimal conditions in service provided by the first proxy cache 420, for example, if network congestion events or bit error rates are observed. Finally, the network location of the proxy cache 420 may be permanently stored in the client 430, which may be appropriate in network implementations where all client communication is funneled through a common network communication hub as may be typical in many set top box implementations.

Figure 5A:
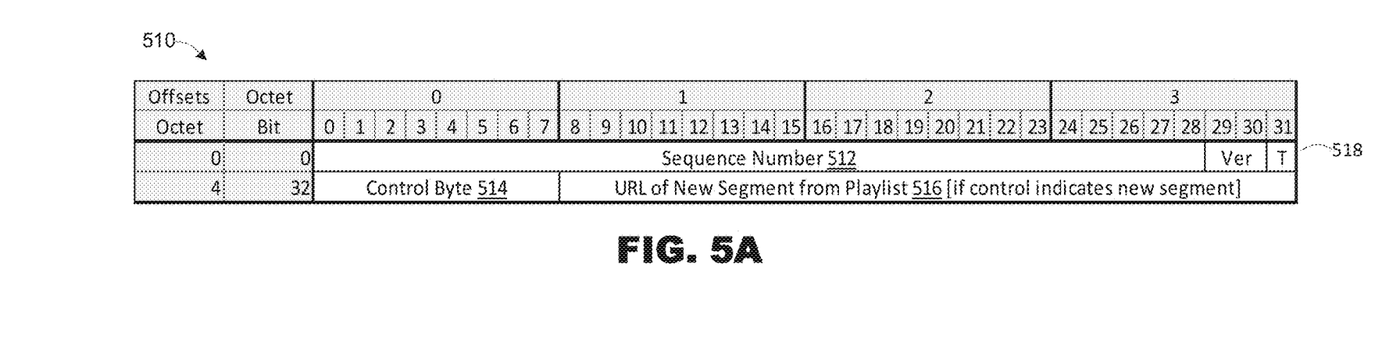
FIGS. 5A and 5B illustrate exemplary protocols for datagrams according to an embodiment of the present invention.
Figure 5B:
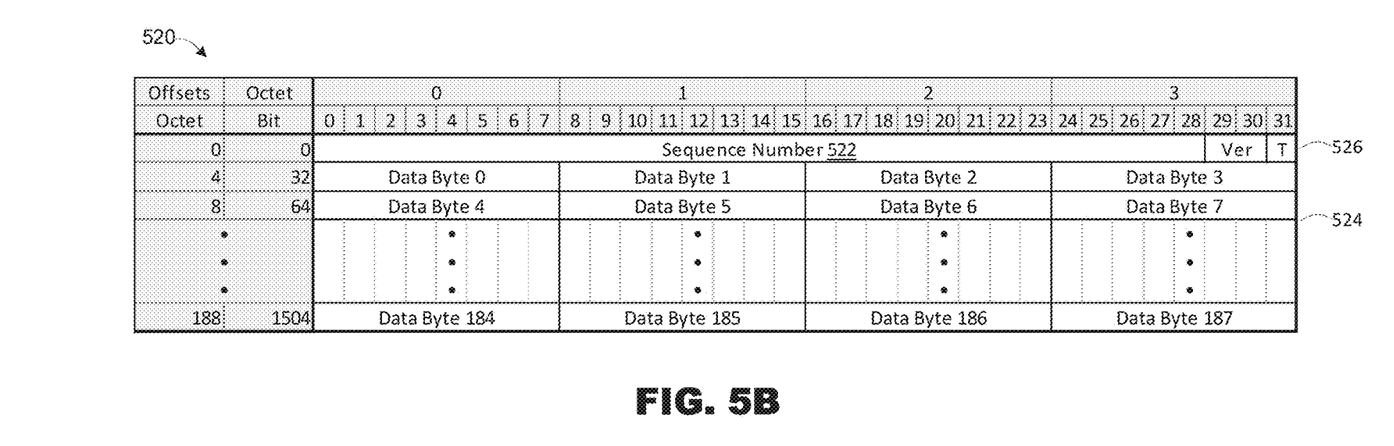

FIGS. 5A and 5B illustrate exemplary protocols for datagrams according to an embodiment of the present invention. FIG. 5A illustrates a datagram 510 containing control information and FIG. 5B illustrates a datagram 520 containing coded segment data.

The control datagram 510 may include fields for a sequence number 512, a control message 514, and address 516 of an associated segment. The sequence number 512 may indicate an order of transmission of the datagram with respect to other datagrams in the broadcast channel. The control message 514 may indicate the onset or termination of a given segment. For example, the control message 514 may indicate that the datagram is a first datagram within a segment or that the datagram is a final datagram in a segment. For control messages 514 representing the start of a new segment, the address 516 may provide location of an associated segment as stored on a media server. For control messages 514 representing the last datagram of the segment, the address 516 may provide location of first datagram in a subsequent segment.

Optional, metadata fields 518 may provide for version control or other signaling functions as may be appropriate.

The datagram containing coded segment 520 may include fields for a sequence number 522 and for coded data 524. The sequence number 522 may indicate an order of transmission of the datagram with respect to other datagrams in the broadcast channel. The coded data 524 may include the coded video data of the segment. Optionally, metadata fields 526 may provide for version control or other signaling functions as may be appropriate.

In the example illustrated in FIG. 5, the datagram format is modeled after the User Datagram Protocol (UDP) defined for Internet protocols. The datagram protocol, however, may be altered to suit other signaling protocols as may be desired.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. Other applications of the present invention may be embodied as a hybrid system of dedicated hardware and software components.

The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture, processing and distribution field having the benefit of this disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A method for processing, at a proxy server, coded media data sent over a broadcast channel, the method comprising:
   receiving, at a proxy server, packets of coded media data transmitted from a media source over the broadcast channel;
   analyzing, at a proxy server, the packets of coded media data to identify segment(s) to which each packet belongs;
   determining, at the proxy server, whether all packets of coded media data belonging to a particular segment have been received;
   upon a determination that all packets belonging to the particular segment are received:
      storing the packets of the particular segment in a cache of the proxy server; and
      generating a mapping between a source address of the segment and location of the particular segment inside the cache of the proxy server; and
   upon a determination that one or more packets belonging to the particular segment have been lost, discarding all packets associated with the particular segment.

2. The method of claim 1, wherein the source address of the particular segment is included in one of the packets.

3. The method of claim 1, further comprising:
   responsive to a request from a client device for another segment, the request including an address of the requested segment, determining, based on the mapping, whether the requested segment is stored in the cache;
   if the requested segment is stored in the cache, transmitting the requested segment to the client device; and
   if the requested segment is not stored in the cache, sending a signal, to the client device, indicating that the requested segment is not available.

4. The method of claim 1, wherein the packet(s) include a code identifying a given packet as a starting packet of a new segment.

5. The method of claim 1, wherein at least one packet includes a code identifying the packet as a starting packet of a new segment and at least one other packet includes another code identifying the other packet as an ending packet of the new segment.

6. The method of claim 1, further comprising providing a plurality of unicast transmissions of segments retrieved from the cache.

7. The method of claim 1, further comprising receiving a playlist over the broadcast channel, wherein analyzing the packets comprises identifying addresses from the playlist.

8. The method of claim 1, wherein upon the determination that some of the packets have been lost, indicating to a client device that a miss has occurred in response to a request from the client device.

9. A media delivery system comprising:
   a cache storing data segments; and
   a proxy server configured to:
      receive packets of coded media data transmitted from a media source over a broadcast channel;
      determine to which segment each packet of coded media data belongs;
      determine whether all packets of coded media data belonging to a particular segment are received;

upon a determination that all packets of coded media data belonging to the particular segment are received, store the particular segment with the packets in the cache; and generate a mapping between a unique address of the particular segment and location of the particular segment inside the cache of the proxy server; and upon a determination that not all packets belonging to the particular segment are received, discard all packets associated with the particular segment.

10. The system of claim 9, wherein the proxy server is further configured to:

receive a request from a client device for another segment, the request including an address of the requested segment;

determine, based on the mapping, whether the requested segment is stored in the cache;

if the requested segment is stored in the cache, transmit the requested segment to the client device; and if the requested segment is not stored in the cache, send a signal, to the client device, indicating that the requesting segment is not available.

11. The system of claim 9, wherein the proxy server is further configured to analyze the packets of data to determine which packet is a starting packet of the segment and which packet is an ending packet of the segment.

12. The system of claim 9, further comprising a media source sending the packets of data over the broadcast channel.

13. The system of claim 12, wherein the media source includes:

memory for storing coded stream of data; and a source server configured to:

code a media stream;

store segments of the coded stream in the memory, each segment including a plurality of packets of data; and generate a playlist including an address to each segment stored in the memory.

14. The system of claim 13, wherein the source server is further configured to periodically send the playlist over the broadcast channel.

15. The system of claim 9, wherein the proxy server is further configured to provide a plurality of unicast transmissions of the stored segments to a client device.

16. The system of claim 9, wherein the proxy server is further configured to receive a playlist over the broadcast channel, wherein determining to which segment each packet belongs comprises identifying addresses from the playlist.

17. The system of claim 9, wherein the source address of the segment is included in one of the packets.

18. The system of claim 9, wherein upon the determination that some of the packets have been lost, the proxy server is configured to indicate to a client device that a miss has occurred in response to a request from the client device.

* * * * *

UNITED STATES PATENT AND TRADEMARK OFFICE
CERTIFICATE OF CORRECTION

PATENT NO. : 9,917,916 B2
APPLICATION NO. : 14/193739
DATED : March 13, 2018
INVENTOR(S) : John Y. Su, David L. Biderman and Roger N. Pantos It is certified that error appears in the above-identified patent and that said Letters Patent is hereby corrected as shown below:

In the Claims

Column 10, Line 10, please change:
"receiving, at a proxy server" to --receiving, at the proxy server--.

Column 10, Line 13, please change:
"analyzing, at a proxy server" to --analyzing, at the proxy server--.

Signed and Sealed this
Twenty-sixth Day of March, 2019

Andrei Iancu
*Director of the United States Patent and Trademark Office*